United States Patent Office.

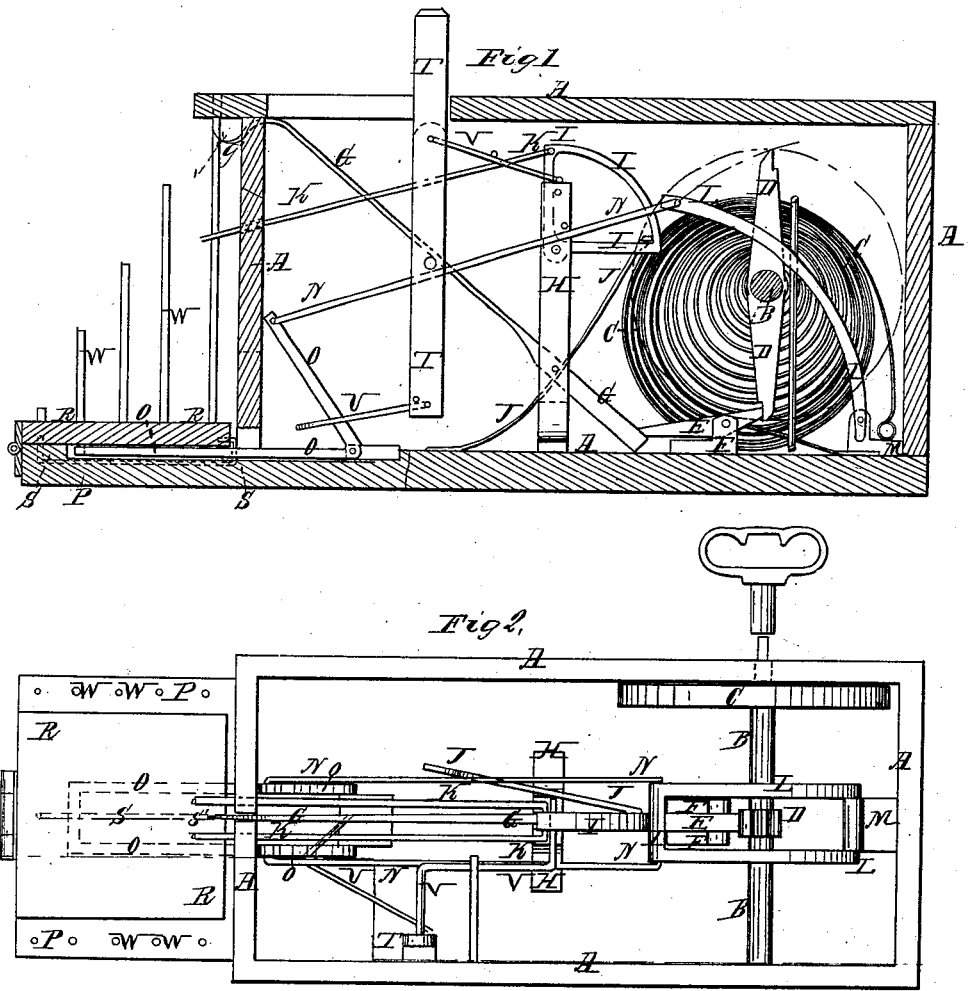

ALFRED WILKIN, OF McCONNELLSVILLE, OHIO.

*Letters Patent No. 70,929, dated November 12, 1867.*

IMPROVED SELF-SETTING GAME-TRAP.

*The Schedule referred to in these Letters Patent and making part of the same.*

TO ALL WHOM IT MAY CONCERN:

Be it known that I, ALFRED WILKIN, of McConnellsville, in the county of Morgan, and State of Ohio, have invented a new and useful improvement in Self-Setting Game-Trap; and I do hereby declare that the following is a full, clear, and exact description thereof, which will enable others skilled in the art to make and use the same, reference being had to the accompanying drawings, forming part of this specification.

Figure 1 is a vertical longitudinal section of my improved trap, taken through the line $x$ $x$, fig. 2.

Figure 2 is a top view of the same, the top or cover of the box being removed.

Similar letters of reference indicate corresponding parts.

My invention has for its object to furnish an improved trap which shall be durable, cleanly, entirely free from the odor of animals, requiring little care to keep it in working order, and capable of destroying large numbers of animals at one setting; and it consists in the construction, combination, and arrangement of the operating parts of the trap as hereinafter more fully described.

A is the box of the trap, which contains the operating parts, and which is made entirely close, the animals never being admitted to its interior. B is a shaft, working in bearings in the sides of the box A, and which may be operated by a spring or weight, as may be desired or convenient. In the drawings, the shaft B is represented as being operated by a spring, C, one end of which is attached to the shaft B, and the other to some fixed support. To the shaft B are attached two arms, D, projecting from opposite sides of the shaft, in a direction at right angles to its length, as shown in fig. 1. E is a short lever, which is pivoted to a support, F, in such a position that the end of its short arm may rest against the end of one of the arms D to set the trap. G is a lever, which is pivoted to a supporting-frame, H, in such a position that the end of its short arm may rest beneath the end of the long arm of the lever E, as shown in fig. 1. The end of the long arm of the lever G projects through a slot in the forward end of the box A, and has a hook formed upon it, to which the bait is attached. I is a quadrant-shaped piece, which is pivoted at its angle to the frame H in such a position that as the shaft B revolves, the end of the arms D may strike against the lower side of the piece I and raise it. The piece I, upon the passage of the arm D, is brought back by the spring J. To the upper end of the forward side of the quadrant I is attached the end of the spear or spears K, the forward or pointed ends of which project through holes in the front end of the box A. L are curved pieces or arms, the lower ends of which are pivoted to a support, M, attached to the bottom of the box A. To the upper end of the curved pieces L are pivoted the ends of the connecting-rods N, the forward ends of which are pivoted to the upper end of the elbow or bent lever or levers O, the angles of which are pivoted to the bottom of the box A, and the forward ends of which pass through slots in the lower part of the forward end of the box A, and enter a recess formed in the upper surface of the stationary platform P, immediately beneath the hinged platform R, with which the forward end or ends of said lever or levers are connected by a keeper, S, attached to the said hinged platform R. The forward end of the platform R is hinged to the forward end of the stationary platform P, so that its rear end may be free to rise and fall. T is a lever, which is pivoted to the side of the box A, and the upper end of which passes up through a slot in the top or cover of said box, as shown in fig. 1. To the lower end of the lever T is attached a hook, U, which passes around the upper end or ends of the elbow-lever O, and to its upper part is attached a hook, V, which passes around the radial arm of the quadrant I, so that by moving the upper end of the lever T forward, the quadrant I and curved arms L may be lifted away, allowing the arms D to revolve backward in winding up the spring or weight. W is a grating placed at the side edges of the stationary platform P, to compel the animal to stand squarely upon the platform B while seeking to reach the bait.

Fig. 1 represents the trap as set. As the animal pulls upon the bait, he operates the lever G to move the lever E away from the arm D, which is immediately moved upward by the force of the spring C, and strikes and raises the quadrant I, projecting the spears K forcibly into the animal, instantly killing him. As the arm D escapes from the quadrant I, it strikes the upper end of the curved pieces L, and, raising them, operates the elbow-levers O, the forward ends of which raise the inner end of the hinged platform R, throwing the dead animal out of the way, and leaving the platform free for the approach of the next animal.

I claim as new, and desire to secure by Letters Patent—

1. The combination of the shaft B, operated by a spring or weight, arms D, short lever E, and lever G, with each other, for the purpose of setting and tripping the trap, substantially as herein shown and described.

2. The combination of the quadrant I and spear K with the arms D of the shaft B, substantially as herein shown and described, for the purpose of killing the animal.

3. The combination of the curved pivoted piece L, connecting-rods N, elbow-levers O, and hinged platform R with each other and with the arms D of the shaft B, substantially as herein shown and described, for the purpose of throwing the dead animal out of the way.

4. The combination of the lever T and hooks U and V with the elbow-levers O and quadrant I, substantially as herein shown and described and for the purpose set forth.

ALFRED WILKIN.

Witnesses:
JAMES A. ADAIR,
JOHN S. ADAIR.